F. L. SHOBER.
AUTOMOBILE CURTAIN.
APPLICATION FILED JAN. 6, 1919.
1,399,895.
Patented Dec. 13, 1921.
3 SHEETS—SHEET 1.
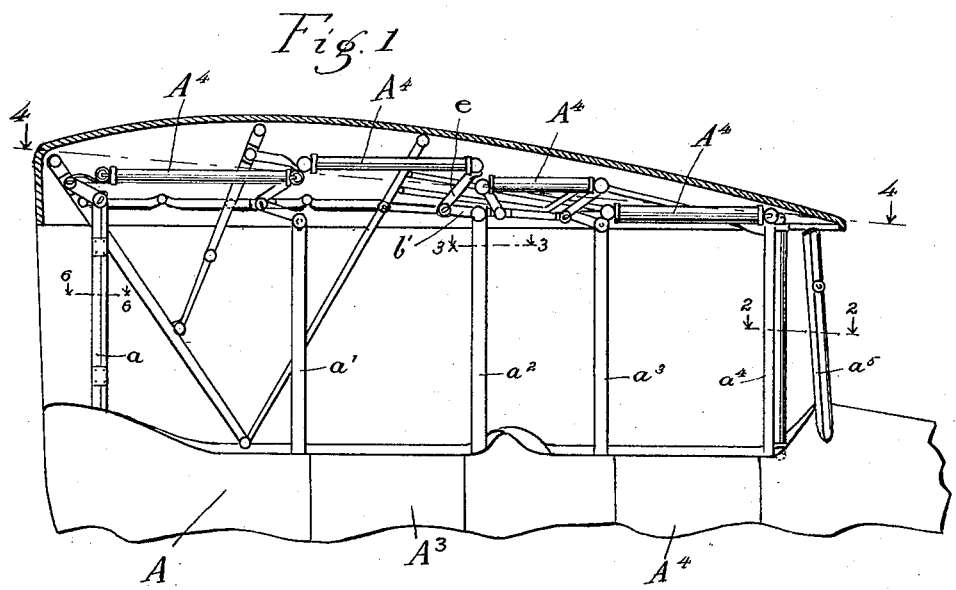
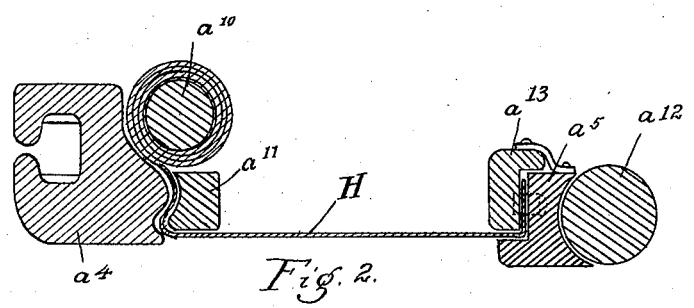
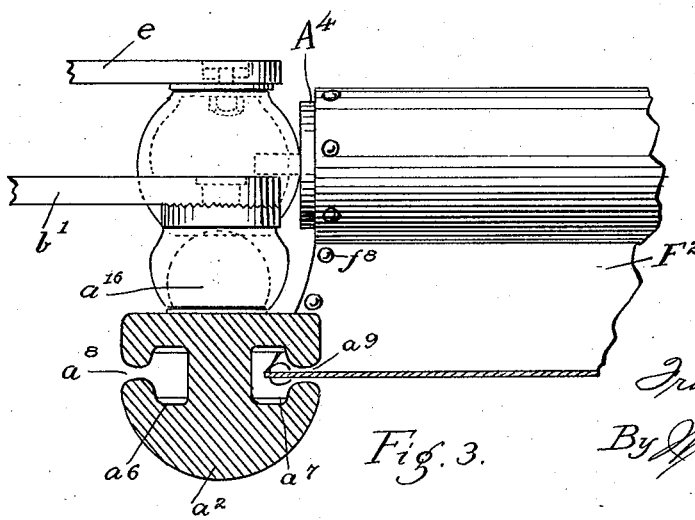
Inventor:
Frank L. Shober
By Walter F. Murray
Attorney.

F. L. SHOBER.
AUTOMOBILE CURTAIN.
APPLICATION FILED JAN. 6, 1919.

1,399,895.

Patented Dec. 13, 1921.
3 SHEETS—SHEET 2.

Inventor:
Frank L. Shober
By Walter F. Murray
Attorney.

F. L. SHOBER.
AUTOMOBILE CURTAIN.
APPLICATION FILED JAN. 6, 1919.
1,399,895.
Patented Dec. 13, 1921.
3 SHEETS—SHEET 3.
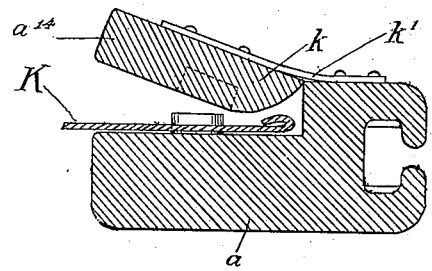
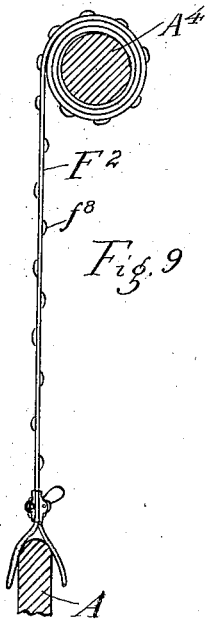
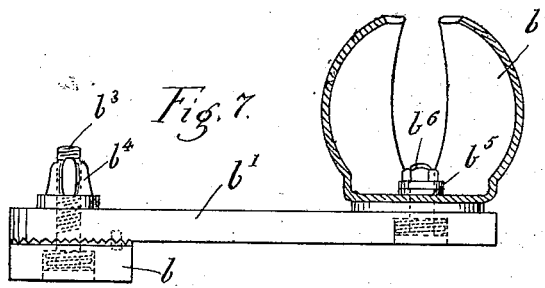
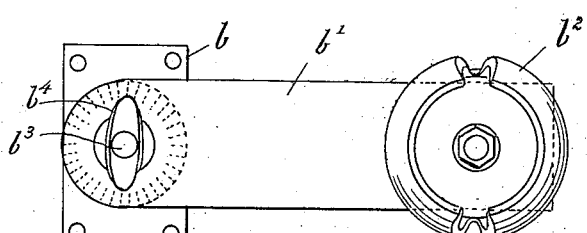
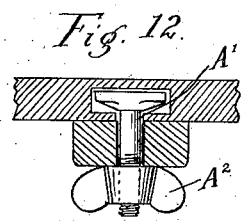
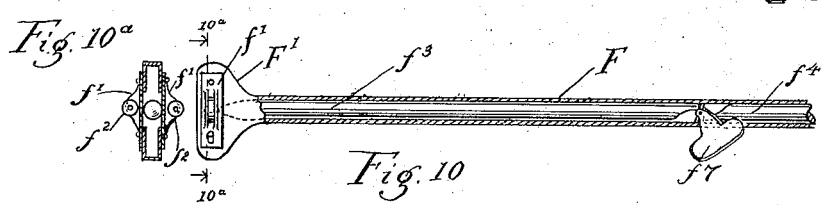
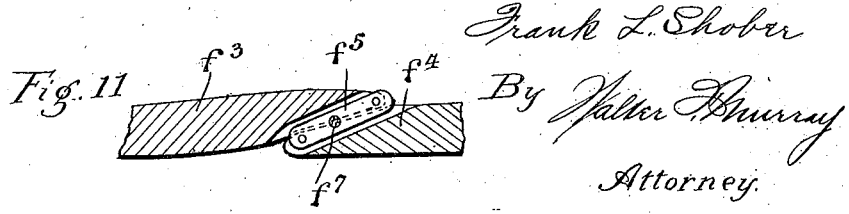
Inventor:
Frank L. Shober
By Walter Murray
Attorney.

UNITED STATES PATENT OFFICE.

FRANK L. SHOBER, OF CINCINNATI, OHIO.

AUTOMOBILE-CURTAIN.

1,399,895.

Specification of Letters Patent.  Patented Dec. 13, 1921.

Application filed January 6, 1919. Serial No. 269,851.

*To all whom it may concern:*

Be it known that I, FRANK L. SHOBER, a citizen of the United States of America, and a resident of Cincinnati, in the county of Hamilton and State of Ohio, have invented a new and useful Improvement in Automobile-Curtains, of which the following is a specification.

Another object of my invention is a curtain construction for automobiles in which the curtains can be placed in operative position simply by drawing them downward much as a shade is drawn down in the windows of houses.

Another object of my invention is automobile curtains that may be adjusted to a position in which they may be folded up with the automobile top without being removed therefrom.

Another object of my invention is a series of automobile curtains that may be readily mounted in automobile tops of various makes.

These and other objects are attained by the means described in the specification and illustrated in the accompanying drawing, in which:—

Figure 1 is a side view of a series of automobile curtains mounted in an automobile top, which is shown in section for the purpose of more clearly illustrating the curtains, which are shown in their rolled up position.

Fig. 2, is a sectional view upon line 2—2 of Fig. 1, of an automobile.

Fig. 3, is a sectional view taken upon line 3—3, of Fig. 1, but looking toward the top of the vehicle and showing a curtain partially unrolled and in section.

Fig. 6, is a sectional view taken upon line 6—6, of Fig. 1, upon an enlarged scale, but showing the side curtain in the act of being fastened in place.

Figs. 7 and 8, are a side elevation and a plan view respectively of the bracket for mounting the curtain roll upon the bow of the vehicle top.

Fig. 9, is a sectional view through a curtain roll, a curtain and the side of the vehicle body.

Fig. 10, is a view partly in elevation and partly in section of one of my curtain rods, its sleeve and its casing.

Fig. 10$^a$, is a sectional view taken upon line 10$^a$—10$^a$, of Fig. 10.

Fig. 11, is a longitudinal sectional detail view of the mechanism connecting the inner ends of the sections of a curtain rod.

Upon each side of the vehicle body I mount a series of upright guides $a$, $a'$, $a^2$, $a^3$, $a^4$, $a^5$. Guides $a'$, $a^2$, $a^3$, and $a^4$, are mounted adjacent to the doors $A^3$, $A^4$. Each of the guides $a'$, $a^2$, and $a^3$, have upon each of their sides vertical ways $a^6$, $a^7$, access to which may be had through vertical slots $a^8$, $a^9$. Upright $a^4$, has a vertical way and a communicating slot only upon its inner side. Its outer side is adjacent to a vertical rod $a^{11}$, and a vertical curtain rod $a^{10}$. Guide $a^5$, is adjacent to the upright $a^4$, of the wind shield, and coöperates with a spring actuated strip $a^{13}$.

Guide $a$, has upon its inner side only, a vertical way and a communicating slot, and upon its opposite side is formed with a way which coöperates with a vertical spring strip $a^{14}$, which is adapted to clamp a curtain between it and the upright guide $a$.

Each of the guides $a$, $a'$, $a^2$, $a^3$, and $a^4$, is secured between the vehicle body and the vehicle top by the following means; at its bottom the guide has a bolt $A'$, whose elongated head seats in a T way in the vehicle body, and which has a wing nut $A^2$, by means of which the bottom of the guide is removably secured or clamped to the body.

At its top the guide is secured to one of the bows of the vehicle top by a bracket, which is illustrated in Figs. 7 and 8, and comprises a plate $b$, arm $b'$, and the socket $b^2$. The contacting faces of the plate $b$, and the arm $b'$, have upon them a series of radiating teeth which are held in engagement with each other by means of a spring bolt $b^3$, and a nut $b^4$, by means of which arm $b'$, may be adjusted to a position in which its socket engages a ball $a^{16}$, which is fixed to the top of a guide $a$, $a'$, $a^2$, $a^3$, or $a^4$. Above the spaces between guides $a$—$a'$, $a'$—$a^2$, $a^3$—$a^4$, are mounted spring rollers $A^4$ and upon which curtains $F^2$, are rolled. The spring rollers $A^4$, are journaled in balls $c^2$, which are held in sockets C, which are swiveled upon the ends of arms $e$, which are mounted upon the bows of the curtain top. These arms $e$, may be mounted upon the bolts $b^3$, which hold the arms $b'$ of the bows, or they may be secured to any other part of the bows which would bring their ends in alinement with the guides.

Figure 4:
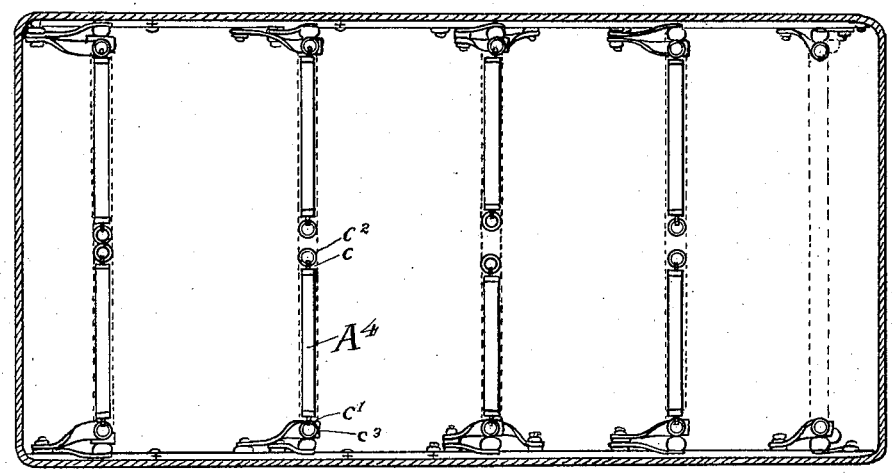
Fig. 4, is a sectional view taken upon line 4—4, of Fig. 1.
Figure 5:
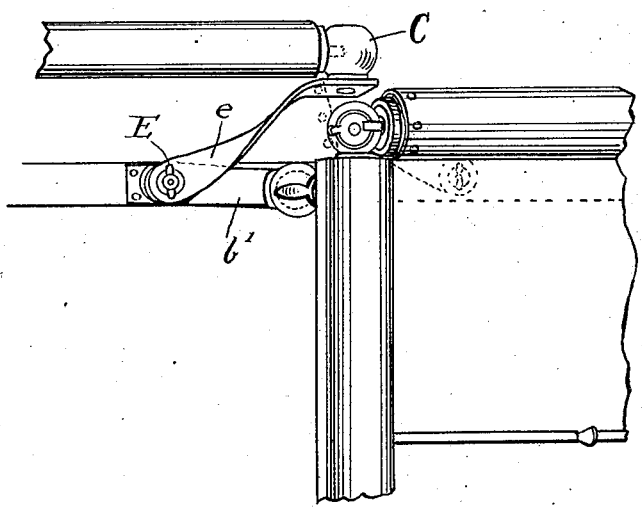
Fig. 5, is a detail elevation taken from the interior of the vehicle, of a vehicle bow, an upright of the vehicle top, and the means of mounting the upright and the curtain upon the vehicle bow.

When mounted in their longitudinal position the curtain rods are engaged at each of their ends by the sockets upon the arms $e$. When in their transverse position such as shown in Fig. 4, the curtain rods $A^4$, are engaged only at their outer ends by said sockets. Curtains $F^2$, have at their lower ends curtain rods, which comprise a cylindrical sleeve F, which has a casing $F'$, at each of its ends, guide wheels $f^2$, carried by the casings, to engage the said walls of the grooves $a^6$, $a^7$, in the guides, and the means of clamping the wheels against the sides of the grooves in the guides. The means of clamping the wheels in the grooves $a^6$, $a^7$, are as follows: Within each sleeve F, there are mounted rods $f^3$, $f^4$, which are tapered at their ends. These tapered ends are adapted to fit between the bases of brackets $f'$, which are secured to the casing $F'$. When moved outward the tapered ends of the rods $f^3$, $f^4$, engage the bases of the brackets and force them outward, so that they carry the wheels $f^2$, into clamping contact with the walls of the grooves $a^6$, $a^7$. The means for actuating the rods $f^3$, $f^4$, comprises a plate $f^5$, which is mounted upon the pivot $f^6$, carrying upon its outer end a crank $f^7$, by means of which the rods $f^3$, $f^4$, are extended or contracted.

When the crank $f^7$ is turned in a counter clockwise direction the plate $f^5$ is also turned, thereby extending the expansion rods $f^3$ and $f^4$. The tapered ends of these expansion rods enter between the bases of the brackets $f'$. The expansion rods have a diameter greater than the space between the brackets $f'$. When the rod has been moved between these brackets, the rods not only contact the wheels as explained above, but by the friction of the brackets upon the rods, remain seated between the brackets. To move the curtain, the crank $f^7$ is turned in a clockwise direction, thereby turning plate $f^5$ and consequently withdrawing the rods from between the brackets $f'$, releasing the wheels from their fixed contact on the guide walls.

The curtains $F^2$, have upon their edges a series of alined buttons $f^8$, which perform the function of preventing the curtain from escaping along its edges from the grooves $a^6$, $a^7$, and also of spacing the layers of the rolls of the curtain upon the rollers. This spacing is advantageous in that it prevents the celluloid lights in the curtains from injurious contact with each other. Adjacent to the guide $a^4$, is a vertically disposed spring roller $a^{10}$, which is mounted from the bows and the vehicle top by arms, balls and sockets similarly to the mounting of the arms $e$. Upon the roller $a^{10}$, is a curtain H, which passes between the guide $a^4$, and the rod $a^{11}$, and is secured at its outer end between the guide $a^5$, and the spring actuated strip $a^{13}$. The edges of the back curtain K, see Fig. 6, are clamped to the guide $a$, by means of a strip $k$, which is attached by a piece of spring metal $k'$, to the guide $a$.

When the curtain rollers are in operative position above the ways formed by the guides $a$, $a'$, $a^2$, $a^3$, $a^4$, the casings $F'$, upon the ends of the curtain rods F, are located in the grooves $a^6$, $a^7$, in the guides, the curtain may then be lowered to any degree desired. When they are pulled down completely the bifurcated ends straddle the top edges of the vehicle top A, as shown in Fig. 9. The curtains may then be clamped in these positions by turning the cranks $f^7$, and forcing the rods $f^3$, $f^4$, apart to clamp the wheels $f^2$, in contact with the walls $a^6$, $a^7$.

The curtains may be adjusted to different positions in the ways, and be clamped at any one of the positions by means of the movement of the rods $f^3$, $f^4$. The space between the guide $a^4$, and $a^5$, and between the end curtain and the guide $a$, may be closed by drawing the respective curtains H, and K, into contact with their respective guides $a$, $a^5$, and by clamping them by means of the spring strip $k$, and $a^{13}$, respectively.

When it is desired to fold up the curtain top, the curtains having been released from the guides, they will roll up, upon the spring rollers, and the balls upon one end of the rollers may be released from their sockets and the rollers may be brought to their transverse position such as shown in Fig. 4. In this position the curtain top may be folded up in the usual way, the curtain rollers fitting in between the folds of the covering material of the top.

The guides may be removed by disengaging the heads of the bolts $A'$, from the T-ways, by bringing the length of the head $A'$, into parallelism with the slot of the T-way, and by disengaging the balls $a^{16}$, from the sockets $b^2$. By disengaging the bolts $a'$ from their T-ways, and leaving the balls $a^{16}$, in engagement with the socket $b^2$, the guides may be rotated about the socket $b^2$, into a transverse position in the top of the vehicle. In this position they may be folded up with the vehicle top. When in place for use the end of a curtain roll is transverse to its bolt $b^6$, see Fig. 7, and when a curtain is across the top of a vehicle it is in alinement with bolt $b^6$.

What I claim is:—

1. The combination of an automobile body, a top having in it a series of bows, a series of guides, means for securing the guides to the body, a series of arms engaging the guides, means connecting the arms and the bows, a series of curtain rollers, and arms mounting the rollers upon the bows and adapted to hold the rollers either in transverse positions or in longitudinal position above the guides.

2. The combination of an automobile body, a top having in it a series of bows, a series of guides, means for securing the guides to the body, a series of arms engaging the guides, means connecting the arms and the bows, a series of curtain rollers, arms mounting the rollers upon the bows and adapted to hold the rollers either in transverse positions or in longitudinal position above the guides, and curtains mounted upon the rollers adjacent to the wind shield standard, and curtain clamps adjacent to the rear guides and adapted to engage the rear curtain.

3. The combination of an automobile body, a top mounted upon the body, a series of guides extending from the body to the top, a series of rollers mounted in the top above the guides, a series of curtains rolled upon the rollers and adapted to engage and to slide in contact with the guides, a sleeve mounted upon the lower ends of the curtains, casings mounted on the outer ends of the sleeve and extending into the guides, brackets mounted on the casing, guide wheels mounted on the brackets, rods mounted within the sleeve and having tapered ends, and means to project the tapered ends of the rods between the brackets whereby the guide wheels are moved into clamping engagement with the guides.

4. The combination of an automobile body, a top mounted upon the body, a series of guides adapted to extend from the body to the top, means for mounting the guides either vertically between the body and the top or in a transverse horizontal position upon the top, a series of rollers, means for mounting the rollers in the top either in transverse positions or in longitudinal positions above the guides, a series of curtains rolled upon the rollers and adapted to engage and to slide in contact with the guides.

5. The combination of an automobile body, a top having in it a series of bows, a series of guides, means for securing the guides to the body, a series of arms engaging the guides and adapted to hold the guides either in a vertical position or in a transverse horizontal position upon the top, means connecting the arms and the bows, a series of curtain rollers, and arms mounting the rollers upon the bows and adapted to hold the rollers either in transverse positions or in longitudinal position above the guides.

6. The combination of an automobile body, a top having in it a series of bows, a series of arms, means connecting the arms and the bows, a series of guides mounted pivotally upon certain of the arms, a series of curtain rollers mounted pivotally upon other arms, the guides and curtain rollers being adapted to be moved to inoperative positions transversely of and upon the top of the vehicle, or to operative positions intermediate the top and body of the automobile, and curtains on the rollers adapted in the operative positions of the guides and rollers to engage in and to slide in contact with the guides.

7. The combination of an automobile body, a top mounted upon the body, a series of guides adapted to extend from the body to the top, means for mounting the guides either vertically between the body and the top or in a transverse horizontal position upon the top, a series of rollers, means for mounting the rollers in the top either in transverse positions or in longitudinal positions above the guides, a series of curtains rolled upon the rollers and adapted to engage and to slide in contact with the guides, and rollers mounted on the guides adjacent the windshield standard adapted to extend between the said guides and the windshield standard.

8. The combination of an automobile body, a top mounted upon the body, a rear curtain extending between the body and the top, a series of guides adapted to extend from the body to the top, means for mounting the guides either vertically between the body and the top or in a transverse horizontal position upon the top, a series of rollers, means for mounting the rollers in the top either in transverse positions or in longitudinal positions above the guides, a series of curtains rolled upon the rollers and adapted to engage and to slide in contact with the guides, and means mounted on the rearmost guides adapted to secure the rear curtain upon the said guides.

9. The combination of an automobile body, a top mounted upon the body, a rear curtain extending between the body and the top, a series of guides adapted to extend from the body to the top, means for mounting the guides either vertically between the body and the top or in a transverse horizontal position upon the top, a series of rollers, means for mounting the rollers in the top either in transverse positions or in longitudinal positions above the guides, a series of curtains rolled upon the rollers and adapted to engage and to slide in contact with the guides, means mounted on the rearmost guides adapted to secure the rear curtain upon the said guides, and rollers mounted on the guides adjacent the windshield standard adapted to extend between the said guides and the windshield standard.

In testimony whereof, I have hereunto subscribed my name this 27th day of December, 1918.

FRANK L. SHOBER.